United States Patent [19]

Haubennestel et al.

[11] Patent Number: 5,187,201

[45] Date of Patent: Feb. 16, 1993

[54] COATING AND MOLDING COMPOSITIONS CONTAINING ALKYL VINYL ETHER POLYMERS AND USE THEREOF AS LEVELING AGENTS OR ANTIFOAM AGENTS

[75] Inventors: Karl-Heinz Haubennestel; Alfred Bubat, both of Wesel, Fed. Rep. of Germany

[73] Assignee: BYK-Chemie GmbH, Wesel, Fed. Rep. of Germany

[21] Appl. No.: 466,149

[22] Filed: Jan. 19, 1990

[30] Foreign Application Priority Data

Jan. 20, 1989 [DE] Fed. Rep. of Germany ....... 3901608

[51] Int. Cl.$^5$ .............................................. B01D 19/04
[52] U.S. Cl. .................................... 524/31; 525/200; 525/231; 525/227; 525/185; 525/187; 525/191; 525/203; 525/213; 525/241; 525/330.7; 525/331.5; 525/403; 525/418; 525/452; 525/480; 525/540
[58] Field of Search ............... 525/227, 231, 200, 185, 525/187, 191, 203, 213, 241, 330.7, 331.5, 403, 418, 452, 480, 540; 524/31

[56] References Cited

U.S. PATENT DOCUMENTS

| | | | |
|---|---|---|---|
| 2,748,083 | 5/1956 | Hollyday et al. | 252/51.5 |
| 3,127,352 | 5/1959 | Stark et al. | 252/52 R |
| 3,328,468 | 6/1967 | Nowak et al. | 568/623 |
| 4,360,643 | 11/1982 | Naylor | 525/386 |
| 4,692,267 | 9/1987 | Fock et al. | 252/321 |
| 4,696,761 | 9/1987 | Haubennestel et al. | 252/358 |
| 4,931,505 | 6/1990 | Miyazaki et al. | 525/200 |

FOREIGN PATENT DOCUMENTS

| | | |
|---|---|---|
| 182234 | 5/1986 | European Pat. Off. |
| 1092585 | 4/1961 | Fed. Rep. of Germany. |
| 1111320 | 2/1962 | Fed. Rep. of Germany. |
| 3442727 | 11/1985 | Fed. Rep. of Germany. |

OTHER PUBLICATIONS

Chemical Abstracts 96(24): 201,378k, Asahi Glass, Feb. 1982.
Goldschmidt Information 1-82, No. 56, pp. 2-7.
Krauss, Zusammenhang zwischen Struktur und einigen lacktechnischen Eigenschaften bei Siliconoelen, pp. 332-337.

*Primary Examiner*—Nathan M. Nutter
*Assistant Examiner*—Jeffrey Culpeper Mullis
*Attorney, Agent, or Firm*—Foley & Lardner

[57] ABSTRACT

Coating compositions and molding compositions containing an amount of alkyl vinyl ether polymer which is effective for improving leveling and/or preventing or eliminating foam, and the use of these copolymers for improving leveling and/or preventing or eliminating foam in coating compositions and molding compositions. The alkyl vinyl ether polymer is a copolymer containing identical or different repeating units of the formula

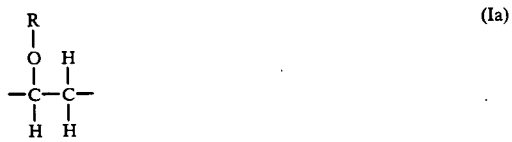
(Ia)

in which R represents a $C_{1-18}$—alkyl group or $C_mF_{2m+1}$—$(CH_2)_2$—group, where m is a number from 4 to 18, and identical or different repeating units of the formula

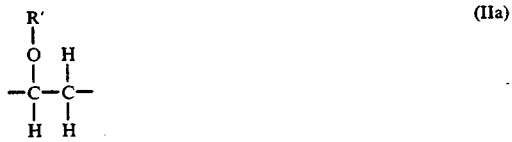
(IIa)

in which R' represents various groups.

9 Claims, No Drawings ns, page 2; 6th Fatipec Congress, 1962, page 332). It is
COATING AND MOLDING COMPOSITIONS CONTAINING ALKYL VINYL ETHER POLYMERS AND USE THEREOF AS LEVELING AGENTS OR ANTIFOAM AGENTS

BACKGROUND OF THE INVENTION

This invention relates to coating compositions and molding compositions containing an amount of alkyl vinyl ether polymer effective to improve leveling and/or prevent or eliminate foam, and to the use of these copolymers for improving leveling and/or preventing or eliminating foam in coating compositions and molding compositions.

Coating compositions and molding compositions are resin systems which contain resins (natural resins and/or synthetic resins) as binders and are described below and in the referenced prior art.

It is known to use polysiloxanes or polysiloxane copolymers as leveling agents in organic resin systems for coatings. The addition of low molecular weight dimethylpolysiloxanes and methylphenylpolysiloxanes is described in German Patent Nos. DE 1,111,320 and DE 1,092,585. It is also known to use polyoxyalkylene-modified dimethylpolysiloxanes in order to achieve similar effects. ("Goldschmidt informiert" 7/1982, No. 56, page 2; 6th Fatipec Congress, 1962, page 332). It is also known to use polyacrylates of certain molecular weight ranges as leveling agents.

The disadvantage with polysiloxanes is that, insofar as they are soluble in the resin systems, they have the property of greatly reducing the surface tension. The tendency of the resin system to foam is consequently increased. Furthermore, polysiloxanes tend to cause defects in the inter-layer adhesion. It is known that products of this type are also used as release agents.

Polyacrylates, like the incompatible polysiloxanes, tend to cause cloudiness in unpigmented resin systems. The products generally used as leveling agents essentially function as a consequence of their ability to greatly reduce the surface tension, and have the disadvantages associated with reduced surface tension.

Commonly used antifoam agents likewise include polysiloxanes, polysiloxane copolymers or polyacrylates. These polymers function by virtue of their limited solubility and reduction of the surface tension. These products have a tendency, due to their pronounced incompatibility, to cause craters and cloudiness in the coating systems. If these systems are not, as is usually the case, dissolved in organic solvents, but in water or in mixtures of water and water-miscible solvents, such as butyl glycol, the crater formation is still more pronounced due to the even greater incompatibility and the greater difference in surface tension.

U.S. Pat. No. 3,127,352 describes high molecular weight polyalkyl vinyl ethers as antifoam agents for liquid hydrocarbons. These products are completely unsuitable in aqueous systems due to their incompatibility.

When used in organic systems, high molecular weight polyvinyl alkyl ethers often cause coating defects, for example in the form of leveling defects and craters. A further disadvantage of these products, accounted for by their incompatibility, is the rapid separation of the resin systems during storage. In unpigmented resin systems this incompatibility also causes pronounced cloudiness in the coating.

Polyalkyl vinyl ethers have been recommended as antifoam agents in aqueous media (U.S. Pat. No. 4,692,267). The fundamental disadvantage of these products is that they are generally incompatible in aqueous systems. According to the aforementioned patent, a slight improvement in the incorporation into aqueous media can be achieved by using emulsifiers. Such emulsifiers have, however, only a temporary effect during incorporation of the antifoam agents into the resin system. During storage of the resin systems, the incompatible substances tend to separate out from the resin system and, in the form of incompatible droplets or particles, cause defects in the coating systems.

The copolymerization of these prior art polyalkyl vinyl ethers with other monomers, such as acrylic esters or methacrylic esters is limited, since according to the literature only alternating copolymerization produces yields which are of interest industrially. If however such large amounts of (meth)acryloyl monomers are used, the essential effect of the alkyl vinyl ethers is lost.

SUMMARY OF THE INVENTION

The object of the present invention is to use alkyl vinyl ether copolymers to promote leveling and antifoam effects.

Another object of the invention is to provide coating and molding compositions containing alkyl vinyl ether copolymers which avoid the aforementioned disadvantages of the prior art.

It is also an object of the invention to provide compositions containing alkyl vinyl ether copolymers which exhibit improved compatibility in various resin systems, even if these systems are dissolved in solvents of different polarity such as naphthas or water.

A further object of the invention is to provide coating and molding compositions with alkyl vinyl ether copolymer additives which promote leveling and antifoam effects, while exhibiting a lesser tendency to cause defects, such as crater formation.

Yet another object of the invention is to provide coating and molding compositions with leveling agents and antifoam agents which do not impair the inter-layer adhesion between two successively applied layers.

It has surprisingly been found that copolymers of alkyl vinyl ethers with polar alkyl vinyl ether derivatives have an improved compatibility in resin systems, and in aqueous resin systems have a self-emulsifying property and improved emulsion stability. Defects such as craters, cloudiness and separation phenomena are consequently substantially avoided.

Not only is the tendency of these polyalkyl vinyl ethers to cause craters avoided, but also due to the leveling properties craters caused by other adverse factors (for example silicones, mineral oils, higher molecular weight resin particles, dust settling) are eliminated or reduced.

The invention therefore relates to coating compositions and molding compositions containing an amount of alkyl vinyl ether polymer effective to improve leveling and/or prevent or eliminate foam, wherein the alkyl vinyl ether polymer is a copolymer which contains, per 100 identical or different repeating units of the formula

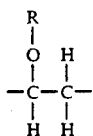

(Ia)

in which R represents a $C_{1-18}$-alkyl ground or $DC_mF_{1m+1}$—$(CH_2)_2$-group wherein m is a number from 4 to 18, 1 to 100 identical or different repeating units of the formula

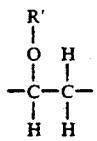

(IIa)

in which R' represents one of the following groups:
- —$(CH_2)_x$—O—$(CH_2$—$CHR_1$—O$)_y$—$R_2$
- —$(CH_2$—$CHR_1$—O$)_z$—$R_3$
- —$(CH_2)_x$—O—[CO—$(CH_2)_5$—O$]_p$—$R_2$
- —$(CH_2)_x$—O—[CO—$(CH_2)_5$—O$]_p$—$(CH_2$—$CHR_1$—O$)_y$—$R_2$
- —$(CH_2)_x$—O—$(CH_2$—$CHR_1$—O$)_y$—[CO—$(CH_2)_5$—O$]_p$—$R_2$
- —$(CH_2)_x$—Q—$(CH_2$—$CHR_1$—O$)_y$—$R_2$
- —$(CH_2)_x$—Q—[$(CH_2)_5$—CO—O$]_p$—$R_6$
- —$(CH_2)_x$—Q—[$(CH_2)_5$—CO—O$]_9$—$(CH_2$—$CHR_1$—O$)_y$—$R_3$
- —$(CH_2)_x$—Q—$(CHR_1$—$CHR_2$—O$)_y$—[$(CH_2)_5$—CO—O$]_p$—$R_6$
- —$(CH_2)_{2-4}$—$NR_4R_5$ wherein $R_1$ is $CH_3$ or H, $R_2$ is H, —$C_nH_{n+1}$ wherein n is a number from 1 to 4, —Co—$CH_3$, or benzyl, $R_3$ is $C_{1-22}$-alkyl or phenyl which may be substituted by 1 to 3 $C_{1-9}$-alkyl groups, $R_4$ and $R_5$ represent alkyl groups having 1 to 4 carbon atoms or together with the nitrogen atom form a 5-membered or 6-membered ring free of Zerewittinoff hydrogen, $R_6$ is $C_{1-22}$-alkyl, Q represents a —O—CO—NH—$R_7$—NH—CO—O—group wherein $R_7$ is alkylene having 6 or 9 carbon atoms, 1,3,3-trimethylcyclohexylene-1-methylene or methylphenylene, x is a number from 2 to 6, y is a number from 0 to 50, z is a number from 1 to 50, and p is a number from 1 to 15.

The invention further relates to the use of an amount of an alkyl vinyl ether copolymer which is effective for improving leveling and/or preventing or eliminating foam in coating compositions and molding compositions, said copolymer containing, per 100 identical or different repeating units of the formula

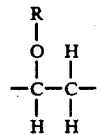

(Ia)

in which R represents a $C_{1-18}$-alkyl group or a $C_mF_{2m+1}$—$(CH_2)_2$—group wherein m is a number from 4 to 18, to 100 identical or different repeating units of the formula

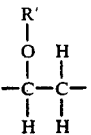

(IIa)

in which R' represents one of the following groups:
- —$(CH_2)_x$—O—$(CH_2$—$CHR_1$—O$)_y$—$R_2$
- —$(CH_2$—$CHR_1O)_z$—$R_3$
- —$(CH_2)_x$—O—[CO—$(CH_2)_5$—O$]_p$—$R_2$
- —$(CH_2)$—O—[CO—$(CH_2)_5O]_9$—$(CH_2$—$CHR_1$—O$)_y$—$R_2$
- —$(CH_2)_x$—O—$(CH_2$—$CHR_1$—O$)_y$—[CO—$(CH_2)_5$—O$]_p$—$R_2$
- —$(CH_2)_x$—Q—$(CH_2$—$CHR_1$—O$)_y$—$R_2$
- —$(CH_2)_x$—Q—[$(CH_2)_5$—CO—O$]_p$—$R_6$
- —$(CH_2)_x$—Q—[$(CH_2)_5$—CO—O$]_p$—$(CH_2$—$CHR_1O)_y$—$P_3$
- —$(CH_2)_xQ$—$(CHR_1$—$CH_2$—O$)_y$[$(CH_2)_5$—CO—O$]_p$—$R_6$
- —$(CH_2)_{2-4}$—$NR_4R_5$ wherein $R_1$ represents $CH_3$ or H, $R_2$ represents H, —$C_nH_{2n+1}$ wherein n is a number from 1 to 4, —CO—$CH_3$ or benzyl, $R_3$ represents $C_{1-22}$-alkyl or phenyl which may be substituted by 1 to 3 $C_{1-9}$-alkyl groups, $R_4$ and $R_5$ represent alkyl groups having 1 to 4 carbon atoms or together with the nitrogen atom form a 5-membered or 6-membered ring free of Zerewittinoff hydrogen, $R_6$ represents $C_{1-22}$-alkyl Q represents a —O—CO—NH—$R_7$—NH—CO—O— group wherein $R_7$ represents alkylene having 6 or 9 carbon atoms, 1,3,3-trimethylcyclohexylene-1-methylene or methylphenylene, x is a number from 2 to 6, y is a number from 0 to 50, z is a number from 1 to 50, and p is a number from 1 to 15.

The copolymers described above are therefore those containing monomers of the general formula

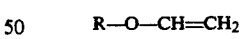

R—O—$CH=CH_2$        (I)

which, relative to 100 moles of identical or different monomers of the formula I, contain polymerized 1 to 100 moles of identical or different monomers of the formula

R'—O—$CH=CH_2$        (II)

wherein R and R' have the meanings given above.

The copolymers used according to the invention can be prepared by copolymerizing the monomers with each other in a known manner as described in detail hereinafter. Monomers which do not yet contain the complete groups defined by the symbol R', but rather precursors of these groups with, for example, terminal hydroxyl groups may however also be copolymerized. After copolymerization these hydroxyl groups can be converted to add on the remaining molecular components the groups defined by the symbol R'. This is also explained below in detail.

Examples of alkyl vinyl ether monomers corresponding to formula I, R—O—CH=CH$_2$, include methyl vinyl ether, ethyl vinyl ether, propyl vinyl ether, isopropyl vinyl ether, butyl vinyl ether, isobutyl vinyl ether, hexyl vinyl ether, 2-ethylhexyl vinyl ether, decyl vinyl ether and octadecyl vinyl ether. Ethyl vinyl ether and isobutyl vinyl ether are particularly preferred.

Compounds of formula I in which R denotes a methyl group are as a rule not used as the only monomers of the formula I. Instead they are generally used in admixture with other monomers of formula I in which the symbol R represents alkyl groups containing 2 to 18 carbon atoms.

Compounds of formula I in which hydrogen atoms are replaced by fluorine atoms include, for example, perfluorohexylethyl vinyl ether and perfluorooctylethyl vinyl ether. The use or concomitant use of these compounds, in particular, significantly increases the surface activity of the copolymers and improves the antifoam effect.

Monomeric vinyl ethers corresponding to formula II, R'—O—CH=CH$_2$, which may be used include vinyl ethers containing hydroxyl groups, such as hydroxyethyl vinyl ether, hydroxypropyl vinyl ether, hydroxybutyl vinyl ether and alkoxylates of these vinyl ethers which contain hydroxyl groups. Vinyl ethers containing hydroxyl groups of both this and other types are described in U.S. Pat. No. 3,328,468. However, vinylated alkoxypolyoxyalkylene glycols, such as methoxypolyethylene glycol monovinyl ether or butoxypolyethylenepolypropylene glycol monovinyl ether, are also suitable. Vinyl ethers of compounds containing tertiary nitrogen such as diethylaminoethyl vinyl ether or dimethylaminoethyl vinyl ether or morpholinoethyl vinyl ether are likewise suitable. Compounds of this type are obtainable by vinylating, for example, diethylaminoethanol by known processes.

The vinyl ethers containing hydroxyl groups corresponding to formula II, R'—O—CH=CH$_2$, can be reacted with lactones such as $\epsilon$-caprolactone to form the corresponding monohydroxypolyester vinyl ethers. Examples of polymerizable lactones and methods of polymerization can be found in U.S. Pat. No. 4,360,643.

Monohydroxypolyester vinyl ethers of this type may also be alkoxylated as disclosed in the prior art. Such measures enable the compatibility of the copolymers to be adapted to the respective resin systems. If it is not intended to have hydroxyl groups in the copolymers, for example due to possible reactions with the resin system, these hydroxyl groups can be protected, for example by acetylation. The measures mentioned for polyesterification with lactones and/or etherification with alkylene oxides can be applied in accordance with the prior art to hydroxyl group-containing copolymers.

In the formulas, x preferably denotes an integer from 2 to 4, particularly preferably 4.

y preferably is an integer from 0 to 30, particularly preferably 0 to 10.

z preferably is an integer from 1 to 30, particularly preferably 1 to 10.

p preferably is an integer from 1 to 10, particularly preferably 1 to 5.

Compounds of formula II in which R$_1$ represents hydrogen are compounds with polyoxyethylene groups. These compounds produce particularly good compatibility in aqueous resin systems. Compounds of formula II in which R$_1$ denotes a methyl group have greater compatibility in resin systems based on organic solvents. As is also mentioned below, mixtures of these comonomers can be used, and a suitable choice of these comonomers and of their components enables the compatibility of the polymers used according to the invention to be regulated. As noted above R$_3$ represents C$_{1-22}$-alkyl or phenyl which may be substituted by 1 to 3 C$_{1-9}$-alkyl groups. Groups represented by the symbol R$_3$ are groups which are conventionally present in nonionic surfactants.

Monomers of formula I and/or formula II may also represent monomer mixtures and be copolymerized in the mixing ratio claimed. Surprisingly, even amounts of one mole of such monomers of the formula II, relative to 100 moles of monomers of the formula I, are effective in the context of the invention.

It is preferred to use up to 30 moles of monomers of the formula II per 100 moles of monomers of the formula I. It is most particularly preferred to use 5 to 25 moles of monomers of the formula II so that the resulting copolymers contain 5 to 25 repeating units of formula IIa per 100 repeating units of formula Ia.

It is particularly preferred to use copolymers with repeating units of formula Ia in which the symbol R represents an alkyl radical containing 2 to 8 carbon atoms, or still more preferably, 2 to 4 carbon atoms.

According to another preferred embodiment, the copolymers contain at least in part repeating units of the formula Ia in which the symbol R represents a perfluoroalkylethyl radical having 4 to 10 carbon atoms in the perfluoroalkyl chain. In such a case it is preferable that, for every 100 repeating units of formula Ia, there are at least 5 units in which the symbol R has the meaning given above.

With regard to the repeating units of formula IIa, those in which the symbol R' represents a hydroxybutylene radical are preferred. According to another embodiment, copolymers which contain repeating units of formula IIa in which the symbol R' represents an alkoxypolyoxyalkylene radical with an average molecular weight M$_w$ of 300 to 1,000 are preferred. Preference is again given to those copolymers with repeating units of formula IIa in which the symbol R' represents a polyester corresponding to the formula

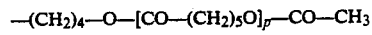

—(CH$_2$)$_4$—O—[CO—(CH$_2$)$_5$O]$_p$—CO—CH$_3$ wherein p represents a number from 2 to 8.

The copolymers used according to the invention are prepared by conventional methods which have been well described in the literature. Cationic and free-radical methods are suitable. (Methoden der organischen Chemie, Houben Weyl E 20/II, pages 1071 et seq.)

Vinyl ethers containing hydroxyl groups must be free-radical polymerized in order to avoid undesired side reactions.

A preferred way to prepare the copolymers according to the invention is the stepwise reaction which has already been referred to, starting from polymeric precursors with hydroxyl groups and subsequently esterifying with lactones and/or alkoxylating. Furthermore, vinyl ether copolymers of this type containing polyether and/or polyester groups can also be obtained by an addition reaction of monoisocyanate-functional polyether adducts and/or polyester adducts. These adducts are prepared by reacting monohydroxy-functional polyesters or polyethers with diisocyanates in a ratio of the diisocyanate used to the OH groups such that preferably only one isocyanate group of the diisocyanate is reacted. This can be achieved, for example, by using diisocyanates with isocyanate groups of different reactivity. One example of such diisocyanates is isophorone diisocyanate. In this diisocyanate, the cycloaliphatically bonded -NCO group is about one-tenth as reactive as the aliphatically bonded -NCO group.

Furthermore, control of the reaction to form the monoadduct can be made easier by using the diisocyanate in larger molar amounts in relation to the OH groups used than would be necessary for the formation of a monoadduct. The excess of diisocyanate used is subsequently removed by vacuum distillation, preferably using a thin-film evaporator.

The average molecular weight $M_w$ of the polyalkyl vinyl ether copolymers used according to the invention should be between 400 and 50,000. $M_w$ is preferably between 1,000 and 10,000, and most particularly preferably between 1,500 and 5,000. The average molecular weight $M_w$ can be determined, for example, by gel permeation chromatography. The weight average of the molecular weight is thereby defined as $M_w$ (Houben Weyl —Methoden der organischen Chemie—Georg Thieme Verlag, Stuttgart Volume XIV/I, page 19).

The polyalkyl vinyl ether copolymers used according to the invention should preferably be added to the resin systems after they have been prepared or first during or after completion of the formulation. It is advantageous to add antioxidants to the polyalkyl vinyl ether copolymers in amounts of about 100 to 500 ppm in order to ensure stability against oxidation. Suitable antioxidants include, for example, p-tert-butylphenol and 4-methoxyphenol.

For use as leveling agents or anitfoam agents, the polyalkyl vinyl ether copolymers used in the invention may advantageously be dissolved in suitable solvents which for convenience may be similar to the solvents used in the resin formulations. Examples of suitable solvents include esters such as ethyl acetate, butyl acetate and diallyl phthalate, ketones such as diisobutyl ketone or methyl ethyl ketone, glycol ethers such as butyl glycol, ethyl glycol and propylene glycol monomethyl ether, glycol ether acetates such as ethyl glycol acetate, propylene glycol monomethyl ether acetate, aromatics such as toluene, xylene or styrene, white spirits, and also mixtures of these solvents with one another. The use of 100% polymer material is also possible, particularly in resin systems which are to be processed in the absence of solvents.

The antifoam effect can be increased in a known manner by preparing the copolymers used according to the invention, optionally in dissolved form as described above, in the presence of hydrophobic silica (German Pat. No. DE 3,442,727) or in the presence of urea derivatives formed in situ (European Pat. Appln. 115,585; U.S. Pat. No. 4,696,761) and using the resulting copolymers in the form of mixtures of this type, i.e. adding the latter to coating compositions and molding compositions.

Coating compositions and molding compositions within the scope of the invention may comprise the most varied resin systems. Examples of coating compositions include paints, other coatings, and printing inks.

These resins can be very different in their chemical composition and may cure physically or chemically as is known in the prior art. Examples of physically-drying binders include those based on nitrocellulose, acrylate-methacrylate, chlorinated rubber, PVC copolymers, polyvinyl esters, polystyrene, polystyrene copolymers and copolymers of butadiene. Examples of chemically curing or drying binders include air-drying alkyd resins, alkyd-melamine resins, acrylate-melamine resins, acrylate-isocyanate resins, polyester-isocyanate resins, epoxy resins, saturated and unsaturated polyester resins, phenol-formaldehyde resins and urea-alkyd resins.

As a liquid phase, these binders may contain organic solvents and/or water or plasticizers as is known in the prior art. The liquid phase can also be present in the form of monomers or low molecular weight compounds which react with other binder components to form paint films.

The resin systems can also be anodically or cathodically depositable synthetic resins (ATL/KTL). These systems comprise aqueous paints in which the resins contain, for example, carboxyl groups or amino groups and which achieve water solubility and the ability to be electrically deposited through salt formation.

The resin systems according to the invention can also be powder coating resins which contain no liquid phase and are applied in the form of powders to the substrates which are to be coated and are caused to melt, and optionally to react, on the substrate. The resin systems according to the invention may also contain other customary additives, e.g. wetting and dispersing agents, fillers such as glass fibers, carbon fibers, polyamide fibers, silicates, inorganic carbonates and aluminum hydroxide, catalysts and/or accelerators for curing, rheologically active agents and so on. The manner of curing the coating compositions and molding compositions depends, as is known to those skilled in the art, on the binders which are contained therein, for example by free-radical polymerization or polyaddition.

The resin systems can also be used in relatively thick layer systems such as floor coatings and roof coatings. If these resins are not applied to substrates but instead are processed in a self-supporting manner with the aid of molds or shaping tools, then they are termed laminates or moldings. The aforedescribed leveling defects and foaming problems also occur in such systems, and the polyvinyl ether copolymers according to the invention can be used just as successfully to solve such problems in these systems.

The amount of polyalkyl vinyl ether copolymers added to the resin systems is, according to the prior art, large enough so that the desired effect is achieved with regard to adequately promoting leveling and/or antifoam effects. Very small amounts can be sufficient in order to achieve a significant effect. The amount of polyvinyl ether copolymers is preferably at least about 0.0001% by weight, particularly preferably at least about 0.001 up to 0.01% by weight, relative to the total weight of the resin system.

The upper limit for the polyvinyl alkyl ether copolymer content is determined by achievement of an adequate effect and by the desire to keep the amount as small as possible so that an excessive addition is avoided for cost reasons. The upper limit is generally about 3.0% by weight, preferably about 2.0% by weight and particularly preferably about 0.5% by weight relative to the total weight of the resin system.

The preparation of the alkyl vinyl ether copolymers used according to the invention is described in the following Preparation Examples 1–11.

The cationic polymerization of the polymers according to the invention is carried out in accordance with the following prescribed general method.

Example 1 by varying the monomers and the initiator concentration.

TABLE 1

| Example | Monomers | Weight Ratio [%] | Initiator concentration | $M_w$ | Modification with hydrophobic solids |
|---|---|---|---|---|---|
| Example 2 | Ethyl vinyl ether | 85 | 100 ppm | 3950 | none |
|  | $CH_2=CH-O-(-CH_2)_4-O(CH_2-CH_2-O)_6-CH_3$ | 15 | | | |
| Example 3 | Isobutyl vinyl ether | 70 | 200 ppm | 3080 | For use as an antifoam agent, after the reaction, 5 g of hydrophobic silica with a specific surface area of 90 m²/g are additionally incorporated by dispersion at room temperature. |
|  | 2-Ethylhexyl vinyl ether | 20 | | | |
|  | $CH_2=CH-O-(CH_2)_4-O(CH_2-CH_2-O)_4-CH_3$ | 10 | | | |
| Example 4 | Isobutyl vinyl ether | 70 | 500 ppm | 1910 | Same modification as described in Example 3. |
|  | $CH_2=CH-O-(CH_2)_2-(CF_2)_6-CF_3$ | 20 | | | |
|  | $CH_2=CH-O-(CH_2)_4-O(CH_2-CH_2-O)_8-CH_3$ | 10 | | | |

EXAMPLE 1

100 g of toluene dried over a molecular sieve and 0.10 g of BF₃-etherate were initially introduced under an atmosphere of nitrogen into a four-necked flask equipped with a stirrer, a reflux condenser, a thermometer and an inert gas feed. A mixture of 160 g of vinyl isobutyl ether and 40 g of $CH_2=CH-O-(CH_2)_4-O-(CH_2-CH_2O)_8-CH_3$ were added dropwise over a period of 2.5 hours at a reaction temperature of 30° C. After the dropwise addition phase had ended, the time allowed for further reaction was 1 hour at 50° C. After the reaction had ended, 0.5 g of 25% strength ammonia solution and 50 ml of twice-distilled water were added to the reaction mixture, and the mixture was stirred vigorously. Then, the lower, aqueous phase was separated. After two further washings, each with 100 ml of twice-distilled water, the toluene and the residual water were distilled off at 80° C. and a pressure of 20 mbar. The clear, slightly yellowish product which was obtained had a viscosity of 810 mPas. Analysis by gel chromatography yielded a value for the weight average molecular weight of Mw =2230.

Further copolymer examples are listed in Table 1. These copolymers were each prepared according to Example 1 by varying the monomers and the initiator concentration.

The free-radical polymerization of the polymers according to the invention is carried out in accordance with the following prescribed general method.

EXAMPLE 5

160 g of isobutyl vinyl ether and 40 g of tetraethylene glycol monovinyl ether were initially introduced into a pressure reactor equipped with a stirrer and metering pump and heated under a nitrogen pressure of 10 bar to 120° C. After the mixture had reached the prescribed temperature, 0.75 ml of tert-butyl peracetate were added. After the temperature had increased to 140° C. as a result of the exothermic reaction, the mixture was allowed to react further for 30 minutes. Then 0.75 ml of tert-butyl peracetate was added at a reaction temperature of 140° C. over a period of 45 minutes. The time allowed for further reaction was 45 minutes. The clear, slightly yellowish product which resulted had a viscosity of 960 mPas. Analysis by gel chromatography yielded a weight average molecular weight value of $M_w$=1050.

Other examples of copolymers prepared in accordance with Example 5 by varying the monomers and the initiator concentration are listed in the following Table 2.

TABLE 2

| Example | Monomers | Weight ratio [%] | Initiator concentration | $M_w$ | Modification with hydrophobic solids |
|---|---|---|---|---|---|
| Example 6 | Isobutyl vinyl ether | 85 | 1% | 1340 | None |
|  | Hydroxybutyl vinyl ether | 15 | | | |
| Example 7 | Isobutyl vinyl ether | 65 | 1% | 1650 | None |
|  | Ethyl vinyl ether | 20 | | | |
|  | Hydroxybutyl vinyl ether | 15 | | | |
| Example 8 | Ethyl vinyl ether | 80 | 2% | 1950 | Same modification as described in Example 3 |
|  | Triethylene glycol vinyl ether | 20 | | | |
| Example 9 | 2-Ethylhexyl vinyl ether | 75 | 2% | 2400 | For use as as antifoam agent, after the reaction, successive additions of 0.85 g of hexamethylene diisocyanate and 1.6 g of decylamine are made at room temperature and these additives are dispersed for 15 minutes. |
|  | Hydroxybutyl vinyl ether | 25 | | | |

EXAMPLE 10

78 g of a copolymer according to Example 6 were initially introduced under an atmosphere of nitrogen into a four-necked flask equipped with a stirrer, reflux condenser, thermometer and inert gas feed and heated to 70° C. After the mixture reached the reaction temperature, 100 ppm of dibutyltin dilaurate and 56 g of a methoxypolyoxyethylene toluene diisocyanate adduct with the following structure $$CH_3-(O-CH_2-CH_2)_8-O-CO-NH-(C_6H_3CH_3)-NCO$$

were added over a period of 30 minutes. After allowing the stirring further for 60 minutes, a product was obtained which had a viscosity of 3850 mPas and a residual —NCO content of <0.1%. Analysis by gel chromatography yielded a weight average molecular weight $M_w = 3850$.

EXAMPLE 11

58 g of ε-caprolactone were added to 78 g of copolymer according to Example 6 in a reaction vessel fitted with a stirrer and a reflux condenser, and after adding 100 ppm of dibutyltin dilaurate the mixture was heated under an atmosphere of nitrogen to 160° C. After a reaction time of 6 hours, the product had a solids content of >98%. Analysis by gel chromatography yielded a weight average molecular weight value of $M_w = 2730$.

The copolymers listed in the examples were tested in the paint systems 1 and 2 listed below. For comparison therewith, five homopolymers or copolymers of alkyl vinyl ethers, not according to the invention, were also tested.

| Comparison polymer 1: | polyisobutyl vinyl ether | $M_w$ 1150 |
| Comparison polymer 2: | polyisobutyl vinyl ether | $M_w$ 110000 |
| Comparison polymer 3: | polyethyl vinyl ether | $M_w$ 3650 |
| Comparison polymer 4: | polyethyl vinyl ether | $M_w$ 85000 |
| Comparison polymer 5: | copolymer of 2-ethylhexyl vinyl ether and isobutyl vinyl ether | $M_w$ 1250. |

Depending on the system being tested, the test criteria used were the leveling of the paint surface, the wetting of the substrate, the binder compatibility, and the foaming behavior during application.

Leveling was assessed visually, with particular care being taken to observe the so-called "orange peel effect". A pronounced "orange peel effect" was considered a poor result, and a smooth homogeneous surface free from craters was regarded as a good result.

Wetting was assessed visually and the result considered good if complete wetting of the substrate occurred. The result was considered poor if partial detachment of the wet paint film from the substrate occurred and consequently no homogeneous surface was produced.

Binder compatibility was evaluated visually using transparent paint films 100 μm in thickness applied to glass plates.

Foaming behavior was evaluted by visual assessment of emulsion paints applied using a foam-backed roller: 50 g of the emulsion paint were dispensed onto a penetration contrast card (500 cm²) and evenly distributed using a foam-backed roller in such a way that 12.5 g of wet paint (=250 g/m²) remained on the card. The use of a foam-backed roller (width 6 cm) composed of open-cell polyurethane foam enabled not only the foam bubbles entrapped in the paint to be assessed, but also the air which is incorporated in the paint film in a way similar to that with brush application. After drying, the paint film was visually assessed for air inclusions (bubble formation) in accordance with the following comparative scale:

1 = no air inclusions
2 = very little air inclusion
3 = little air inclusion
4 = moderate air inclusion
5 = pronounced air inclusion
6 = very pronounced air inclusion In addition, the air inclusion was assessed in % by volume by the following method: 80% by weight of the prepared emulsion paint was mixed with 20% by weight of water and stirred in each case for 1 minute at 2,000 rpm in a high speed mixer (rotor blade diameter 40 mm). The weight of 50 ml of this mixture was then determined. The higher the weight of the sample, the lower the air content and thus the greater the efficiency of the antifoam agent.

As an example of molding compositions, glass fiber reinforced test plates (250 mm ×250 mm ×5 mm) were prepared by the injection molding process. After final curing and removal from the mold, the test plates were visually assessed for air entrapment, glass fiber wetting and transparency in accordance with the following comparative scales:

air entrapment:
1 = no air entrapment
2 = very little air entrapment
3 = little air entrapment
4 = moderate air entrapment
5 = pronounced air entrapment
6 = very pronounced air entrapment.

fiber wetting:
1 = very good fiber wetting
2 = good fiber wetting
3 = moderate fiber wetting.

The results are compiled in Tables 3, 4 and 5 and clearly show the superiority of the agents of the invention.

| Paint 1: Photopolymerizable furniture varnish: | |
|---|---|
| Unsaturated polyester gloss resin 68% soln. in styrene | 92.59% by wt. |
| Styrene | 7.41% by wt. |
| | 100.00% by wt. |
| Curing: | |
| 2 passes | |
| 80 W/cm UV lamp 1.6 m/min. | |
| Paint 2: Gloss emulsion paint: | |
| Acrylate emulsion (Primal ® AC 4800/Rohm and Haas) 40% conc. | 57.60% by wt. |
| Preservative | 0.10% by wt. |
| TiO₂ | 18.75% by wt. |
| Dibutyl phthalate | 2.34% by wt. |
| Tri-n-butyl phosphate | 3.50% by wt. |
| Propylene glycol | 7.50% by wt. |
| Thickening agent | 2.80% by wt. |
| Wetting and dispersing agent | 0.85% by wt. |
| Water | 6.56% by wt. |
| | 100.00% by wt. |
| PVC: 18.5% | |
| Gloss 20° (DIN 67,530): 80 | |
| Injection Molding Resin: | |
| Unsaturated polyester resin based on isophthalic acid | 98% by wt. |
| Cobalt octoate solution (1% solution) | 1% by wt. |
| Peroxide hardener (MEKP) | 1% by wt. |

TABLE 3

Leveling test - Paint 1

| Example | Concentration | Leveling | Transparency | Wetting of the substrate |
|---|---|---|---|---|
| Comparison polymer 1 | 0.05% | good | cloudy | good |
| Comparison polymer 2 | 0.05% | craters | cloudy | craters |
| Comparison polymer 3 | 0.05% | good | cloudy | good |
| Comparison polymer 4 | 0.05% | craters | cloudy | craters |
| Comparison polymer 5 | 0.05% | good | cloudy | good |
| Example 1 | 0.05% | very good | clear | very good |
| Example 2 | 0.05% | very good | clear | very good |
| Example 5 | 0.05% | very good | clear | very good |
| Example 6 | 0.05% | very good | clear | very good |
| Example 7 | 0.05% | very good | clear | very good |
| Example 10 | 0.05% | very good | clear | very good |
| Example 11 | 0.05% | very good | clear | good |

TABLE 4

Test of antifoam agent - Paint 2

| Example | Concentration | Antifoam | Leveling | Gloss degree at 20° |
|---|---|---|---|---|
| Comparison polymer 1 | 0.05% | 4 | good | 74 |
| Comparison polymer 1 | 0.15% | 3 | good | 69 |
| Comparison polymer 2 | 0.05% | 6 | craters | not measurable |
| Comparison polymer 2 | 0.15% | 6 | craters | not measurable |
| Comparison polymer 3 | 0.05% | 5 | good | 73 |
| Comparison polymer 3 | 0.15% | 4 | good | 70 |
| Comparison polymer 4 | 0.05% | 6 | craters | not measurable |
| Comparison polymer 4 | 0.15% | 5 | craters | not measurable |
| Comparison polymer 5 | 0.05% | 4 | poor | 70 |
| Comparison polymer 5 | 0.15% | 3 | poor | 65 |
| Example 3 | 0.05% | 3 | good | 79 |
| Example 3 | 0.15% | 1 | very good | 81 |
| Example 4 | 0.05% | 3 | good | 80 |
| Example 4 | 0.15% | 1-2 | good | 80 |
| Example 8 | 0.05% | 2 | good | 80 |
| Example 8 | 0.15% | 1 | very good | 79 |
| Example 9 | 0.05% | 3 | good | 80 |
| Example 9 | 0.15% | 2 | good | 79 |
| Blank Sample | — | 6 | good | 80 |

TABLE 5

Evaluation of Injection Molded Test Plates

| Example | Dosing | Air Entrapment | Glass Fiber Wetting | Transparency |
|---|---|---|---|---|
| Comparison Polymer 1 | 0.05% | 4 | 2 | slightly turbid |
| Comparison Polymer 2 | 0.05% | 1 | 2 | turbid |
| Comparison Polymer 3 | 0.05% | 5 | 3 | slightly turbid |
| Comparison Polymer 4 | 0.05% | 3 | 2 | turbid |
| Comparison Polymer 5 | 0.05% | 3 | 2 | turbid |
| Example 1 | 0.05% | 3 | 2 | clear |
| Example 2 | 0.05% | 3 | 2 | clear |
| Example 5 | 0.05% | 2 | 1 | clear |
| Example 6 | 0.05% | 1-2 | 1 | clear |
| Example 7 | 0.05% | 2 | 2 | clear |
| Example 10 | 0.05% | 2-3 | 2 | clear |
| Example 11 | 0.05% | 2 | 1-2 | clear |

What is claimed is:

1. A coating or molding composition comprising a resin binder component and an amount up to about 3.0% by weight relative to the total weight of the resin system of an alkyl vinyl ether polymer which is effective for improving leveling or suppressing foaming, wherein said alkyl vinyl ether polymer is a coploymer which consists essentially of, per 100 identical or different repeating units of the formula

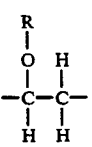
(Ia)

in which R represents a $C_{1-18}$-alkyl group, 1 to 100 identical or different repeating units of the formula

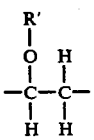
(IIa)

in which R' represents one of the following groups:
—$(CH_2)_x$—O—$(CH_2$—$CHR_1$—O$)_y$—$R_2$
—$(CH_2$—$CHR_1$—O$)_z$—$R_3$
—$(CH_2)_x$—O—[CO—$(CH_2)_5$—O$]_p$—$R_2$
—$(CH_2)_x$—O—[CO—$(CH_2)_5$—O$]_p$—$(CH_2$—$CHR_1$—O$)_y$—$R_2$
—$(CH_2)_x$—O—$(CH_2$—$CHR_1$—O$)_y$—[CO—$(CH_2)_5$—O$]_p$—$R_2$
—$(CH_2)_x$—Q—$(CH_2$—$CHR_1$—O$)_y$—$R_2$
—$(CH_2)_x$—Q—[$(CH_2)_5$—CO—O$]_p$—$R_6$
—$(CH_2)_x$—Q—[$(CH_2)_5$—CO—O$]_9$—$(CH_2$—$CHR_1$—O$)_y$—$R_3$
—$(CH_2)_x$—Q—$(CHR_1$—$CHR_2$—O$)_y$—[$(CH_2)_5$—CO—O$]_p$—$R_6$
—$(CH_2)_{2-4}$—$NR_4R_5$ wherein
$R_1$ represents $CH_3$ or H,
$R_2$ represents H, —$CH_nH_{2n+1}$ wherein n is a number from 1 to 4, —CO—$CH_3$, or benzyl,
$R_3$ represents $C_{1-22}$-alkyl or phenyl which may be substituted by 1 to 3 $C_{1-9}$-alkyl groups,
$R_4$ and $R_5$ represent alkyl groups having 1 to 4 carbon atoms or together with the nitrogen atom form a 5-membered or 6-membered ring free of Zerewittinoff hydrogen,
$R_6$ represents $C_{1-22}$-alkyl,
Q represents a —O—CO—HN-$R_7$NH—CO—O— group wherein $R_7$ represents alkylene having 6 or 9 carbon atoms, 1,3,3-trimethylcyclohexylene-1-methylene or methylphenylene,
x is a number from 2 to 6, y is a number from 0 to 50,
z is a number from 1 to 50, and
p is a number from 1 to 15.

2. A composition as claimed in claim 1, wherein the copolymer contains from 5 to 25 repeating units of formula IIa per 100 repeating units of formula Ia.

3. A composition as claimed in claim 1, wherein R' in formula IIa represents a hydroxybutylene radical.

4. A composition as claimed in claim 1, wherein R' in formula IIa represents an alkoxypolyoxyalkylene radical with an average molecular weight $M_w$ of 300 to 1000.

5. A coating or molding composition comprising a resin binder component and an amount of an alkyl vinyl ether polymer which is effective for improving leveling or suppressing foaming, wherein said alkyl vinyl ether polymer is a copolymer which consists essentially of, per 100 identical or different repeating units of the formula

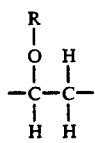 (Ia)

in which R represents an alkyl radical having 2 to 8 carbon atoms, 1 to 100 identical or different repeating units of the formula

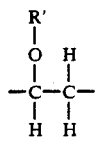 (IIa)

in which R' represents one of the following groups:
—$(CH_2)_x$—O—$(CH_2$—$CHR_1$—O$)_y$—$R_2$
—$(CH_2$—$CHR_1$—O$)_z$—$R_3$
—$(CH_2)_x$—O—[CO—$(CH_2)_5$—O$]_p$—$R_2$
—$(CH_2)_x$—O—[CO—$(CH_2)_5$—O$]_p$—$(CH_2$—$CHR_1$—O$)_y$—$R_2$
—$(CH_2)_x$—O—$(CH_2$—$CHR_1$—O$)_y$—[CO—$(CH_2)_5$—O$]_p$—$R_2$
—$(CH_2)_x$—Q—$(CH_2$—$CHR_1$—O$)_y$—$R_2$
—$(CH_2)_x$—Q—[$(CH_2)_5$—CO—O$]_p$—$R_6$
—$(CH_2)_x$—Q—[$(CH_2)_5$—CO—O$]_9$—$(CH_2$—$CHR_1$—O$)_y$—$R_3$
—$(CH_2)_x$—Q—$(CHR_1$—$CHR_2$—O$)_y$—[$(CH_2)_5$—CO—O$]_p$—$R_6$
—$(CH_2)_{2-4}$—$NR_4R_5$
wherein
$R_1$ represents $CH_3$ or H,
$R_2$ represents H, —$C_nH_{2n+1}$ wherein n is a number from 1 to 4, —CO—$CH_3$, or benzyl, $R_3$ represents $C_{1-22}$-alkyl or phenyl which may be substituted by 1 to 3 $C_{1-9}$-alkyl groups,
$R_4$ and $R_5$ represents alkyl groups having 1 to 4 carbon atoms or together with the nitrogen atom form a 5-membered or 6-membered ring free of Zerewittinoff hydrogen,
$R_6$ represents $C_{1-22}$-alkyl,
Q represents a —O—CO—NH—$R_7$—HN—CO—O— group wherein $R_7$ represents alkylene having 6 to 9 carbon atoms, 1,3,3-trimethylcyclohexylene-1-methylene or methylphenylene,
x is a number from 2 to 6,
y is a number from 0 to 50,
z is a number from 1 to 50, and
p is a number from 1 to 15.

6. A composition as claimed in claim 5, wherein in formula Ia represents an alkyl radical having 2 to 4 carbon atoms.

7. A coating or molding composition comprising a resin binder component and an amount of an alkyl vinyl ether polymer which is effective for improving leveling or suppressing foaming, wherein said alkyl vinyl ether polymer is a copolymer which consists essentially of, per 100 identical or different repeating units of the formula

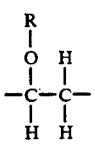 (Ia)

in which R represents a $C_{1-18}$-alkyl group or $C_mF_{2m+1}$-$(CH_2)_2$—group, where m is a number from 4 to 18, 1 to 100 identical or different repeating units of the formula

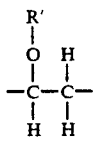 (IIa)

in which R' represents a polyester corresponding to the formula

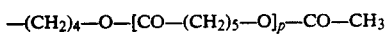

in which p represents a number from 2 to 8.

8. A composition as claimed in claim 7, wherein R in formula Ia represents a perfluoroalkylethyl radical having 4 to 10 carbon atoms in the perfluoroalkyl chain.

9. A composition as claimed in claim 7, wherein at least 5 of every 100 repeating units of formula Ia are units in which R represents a perfluoroalkylethyl radical having 4 to 40 carbon atoms in the perfluoroalkyl chain.

* * * * *